(No Model.)
T. N. SCOTT.
STEAM COOKER.
No. 489,718.  Patented Jan. 10, 1893.
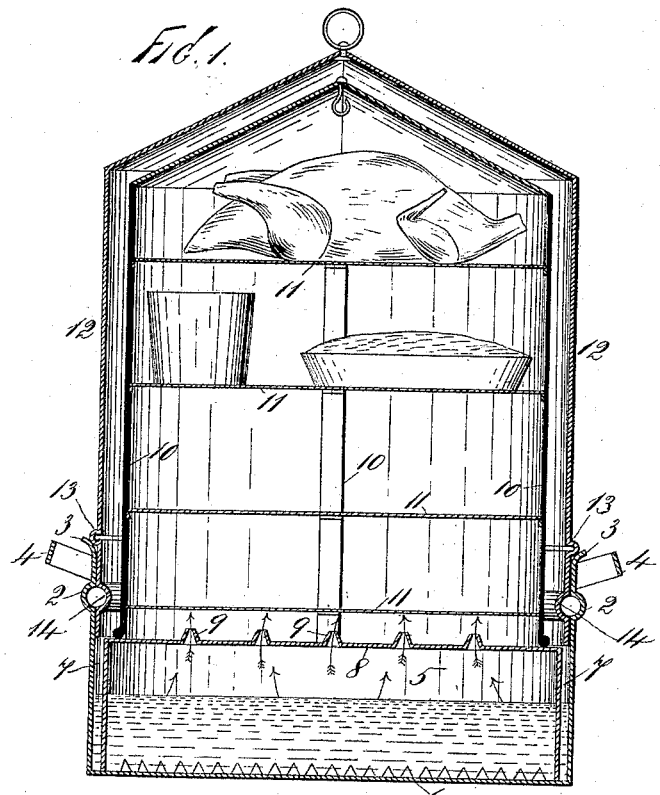
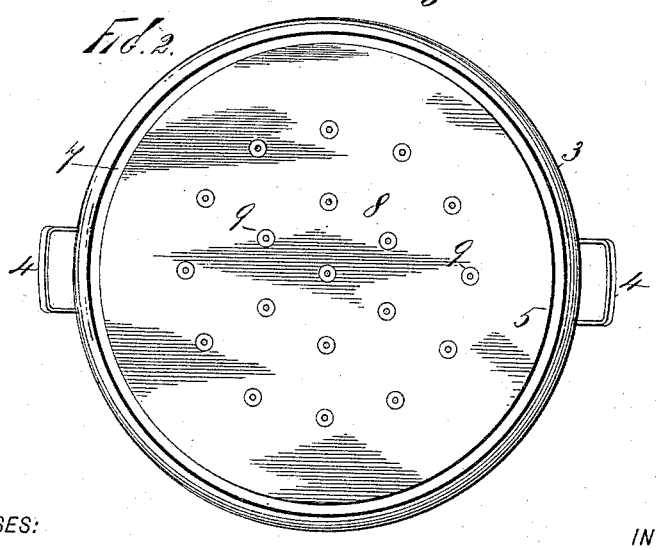
WITNESSES:
Mn Buckler,
F. H. Pierce,
INVENTOR
T. N. Scott,
BY A. M. Pierce
ATTORNEY.

UNITED STATES PATENT OFFICE.

THEODOR N. SCOTT, OF NEW YORK, N. Y.

STEAM-COOKER.

SPECIFICATION forming part of Letters Patent No. 489,718, dated January 10, 1893.

Application filed July 14, 1892. Serial No. 440,067. (No model.)

*To all whom it may concern:*

Be it known that I, THEODOR N. SCOTT, a citizen of the United States, residing in the city, county, and State of New York, have invented new and useful Improvements in Steam-Cookers, of which the following is a specification.

My invention relates especially to means and mechanism employed for cooking victuals by means of steam, and has for its object the provision of a steam cooker simple and cheap to construct, and very effective in operation.

To attain the desired end, my invention consists in certain novel and useful combinations or arrangements of parts, and peculiarities of construction and operation, all of which will be hereinafter first fully described, and then pointed out in the claims.

In the drawings, Figure 1 is a vertical, axial sectional view of a steam cooker, constructed in accordance with my invention. Fig. 2 is a plan view of the device with the victual supporting frame, and the outside cover removed.

Like numerals of reference, wherever they occur, indicate corresponding parts in both figures.

1 is the water holder, having an outwardly projecting bead 2, formed below its upper edge, the said edge being made flaring, as at 3.

4 are handles for lifting the water holder.

5 is a steam holder, consisting of a bottomless cylinder, the lower edge whereof is preferably notched, as at 6, said cylinder fitting into the water holder in such a manner as to leave an annular space 7 between it and the vertical wall of the water holder. The top 8, of the steam holder is provided with perforated cones 9, the perforations being quite minute.

10 is a frame, provided with shelves 11, whereon the food to be cooked may be placed.

12 is an outside cover, somewhat greater in height than the frame 10, arranged to fit thereover. At 13 there is an outwardly projecting bead designed to rest upon the flaring top 3 of the water holder, making a tight joint between the separable parts. Below this bead 13 is an inwardly projecting bead 14, the lower edge of the cover extending downward a short distance farther.

When constructed and arranged in accordance with the above description, the operation of my steamer is as follows: Water being placed in the holder 1, the steam holder is put in position, as shown, and the frame containing the food to be cooked is mounted thereon, after which the outside cover 12 is placed over all. When the water boils, the steam will collect within the holder, escaping in a dry state through the perforations in the cones 9, and under pressure. The weight of the frame 10 and the food will keep the steam holder down under all ordinary circumstances, but if the pressure of steam is too great to pass off through the conical escapes, the holder will be raised, with the supported parts, giving more space for the steam in the holder, the limit of upward movement being regulated by the top of the cover 12. The condensation from the steam will pass down the sides of the cover 12, and drop onto the top of the steam holder, and flow down into the space around it, being prevented from flowing into the holder through the steam orifices, by their peculiar arrangement. Any grease carried by the condensing steam will flow into the space around the steam holder, and being lighter than the water, will float thereon, and remain in said space, thus keeping the water in the steam holder free and pure. Any steam passing between the wall of the water holder and the cover, will enter the space formed by the two beads 2 and 14, condensing there, and forming a seal rendering the joint practically steam tight, and preventing escape thereof to the outer atmosphere.

Having now fully described my invention, what I claim as new therein, and desire to secure by Letters Patent, is:—

1. In a steam cooker, a water holder having an outwardly projecting bead near its upper edge, and a cover having an inwardly projecting bead near its lower edge, in combination with a steam holder of less diameter than the water holder, said steam holder being open at the bottom and having steam outlets in its top, substantially as shown and described.

2. A steam cooker in which is comprised a water holder having an outwardly projecting bead near its upper edge, and a cover having an inwardly projecting bead near its lower edge, in combination with an open bottom steam holder located within the water holder, said steam holder being free to move within the water holder, and having steam exits in its top; and a food holding rack mounted upon the steam holder, the whole combined and arranged to operate, substantially as shown and described.

3. In a steam cooker of the character herein specified, the combination with the water holder, having an outwardly projecting bead near its upper edge, of a cover having an inwardly projecting bead near its lower edge, said water holder and cover being arranged to engage with each other, substantially as shown and described.

THEODOR N. SCOTT.

Witnesses:
A. M. PIERCE,
ISABEL CHESTER.